United States Patent [19]
Shimizu et al.

[11] 4,355,837
[45] Oct. 26, 1982

[54] GLOVE COMPARTMENT

[75] Inventors: Kenzo Shimizu, Yokosuka; Yukio Fukunaga; Hiroshi Tsuda, both of Yokohama, all of Japan

[73] Assignee: Nissan Motor Co., Ltd., Yokohama, Japan

[21] Appl. No.: 197,910

[22] Filed: Oct. 17, 1980

[30] Foreign Application Priority Data

Oct. 24, 1979 [JP] Japan ............................ 54-146223[U]

[51] Int. Cl.³ .............................................. B60R 7/06
[52] U.S. Cl. ................................................ 296/37.12
[58] Field of Search .................... 296/37.12, 37.1, 37.8

[56] References Cited
U.S. PATENT DOCUMENTS

| | | | |
|---|---|---|---|
| 2,111,434 | 3/1938 | Morrison | 296/37.12 |
| 2,382,011 | 8/1945 | Howard | 296/37.12 |
| 2,571,627 | 10/1951 | Sloman et al. | 296/37.12 |
| 3,082,033 | 3/1963 | Bosher | 296/37.1 |
| 3,132,892 | 5/1964 | Stevens | 296/37.12 |

Primary Examiner—Richard A. Bertsch

[57] ABSTRACT

A glove compartment provided in an instrument panel of an automobile disclosed herein comprises a first lid adapted to be opened to provide a wide coplanar surface with a bottom of the compartment, and an upper lid adapted to be opened into an upper opened position, thereby providing a wide space for writing and putting baggage on the opened first lid and the bottom of the compartment.

4 Claims, 5 Drawing Figures

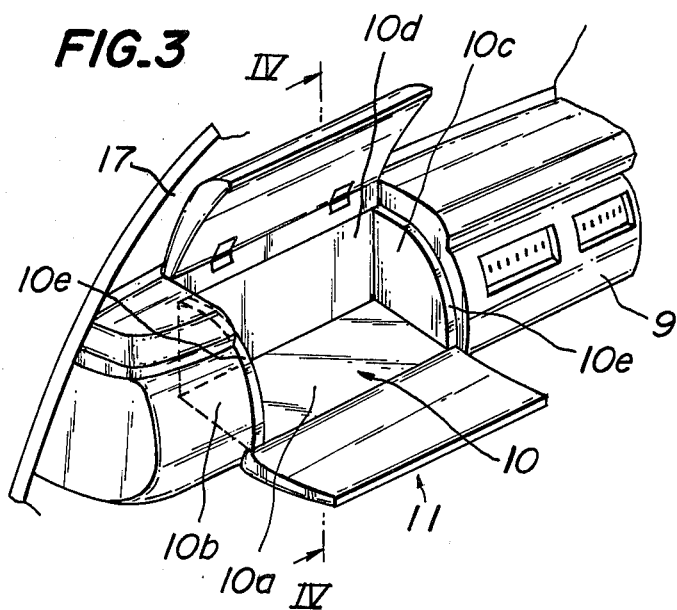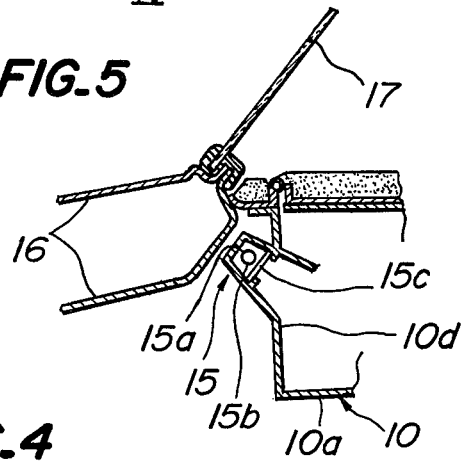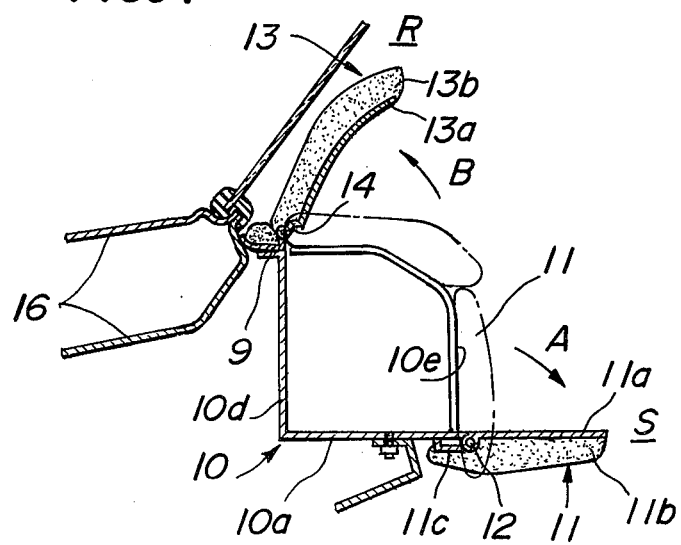

GLOVE COMPARTMENT

BACKGROUND OF THE INVENTION

1. Field of the Invention

The present invention relates to a glove compartment provided in an instrument panel of an automobile.

In this specification and claims, "front" means the front side of the engine hood side of the automobile and "rear" means the side of a driver's seat.

2. Description of the Prior Art

A hitherto used glove compartment is, for example, shown in FIGS. 1 and 2. An instrument panel 1 is integrally formed with a glove compartment 2 having a lid 3 adapted to be pivotally moved in an open position shown in solid lines about a hinge 4 provided at the lower edge of an opening of the compartment and kept in the substantially horizontal position by means of a stopper 5. An upper pad 6, a cowel top panel 7 and a windshield 8 are shown in the drawings.

With this arrangement of the compartment, the lid 3 is pulled or pushed to open or close respectively the opening 2a of the glove compartment. The lid 3 can be used in its open position as a support for writing, but it is very inconvenient for this purpose, because of its short longitudinal length, its uneven surface 3a and a difference H in height between the surface 3a and a bottom surface 2b of the compartment and further because of the stopper 5 and upper pad 6 which would probably obstruct the user's writing.

Moreover, when it is desired to put a small or hand baggage on the inner panel 3a of the lid 3, it is impossible to do so due to the narrow area of the lid or if possible, the baggage is unavoidably unstable.

SUMMARY OF THE INVENTION

It is an object of the invention to provide an improved glove compartment which overcomes the disadvantages of the prior art and is capable of providing a wide desk surface for writing and a wide space for putting hand baggage thereon and making it easy to take a good in and out of the compartment.

The invention will be more fully understood by referring to the following detailed specification and claims taken in connection with the appended drawings.

BRIEF DESCRIPTION OF THE DRAWINGS

FIG. 3 is a perspective view of a glove compartment according to the invention;

FIG. 4 is a sectional view of the glove compartment taken along the line IV—IV in FIG. 3; and FIG. 5 is a sectional view of a glove compartment of another embodiment of the invention provided with an illuminator.

DETAILED DESCRIPTION OF THE PREFERRED EMBODIMENT

Figure 1:
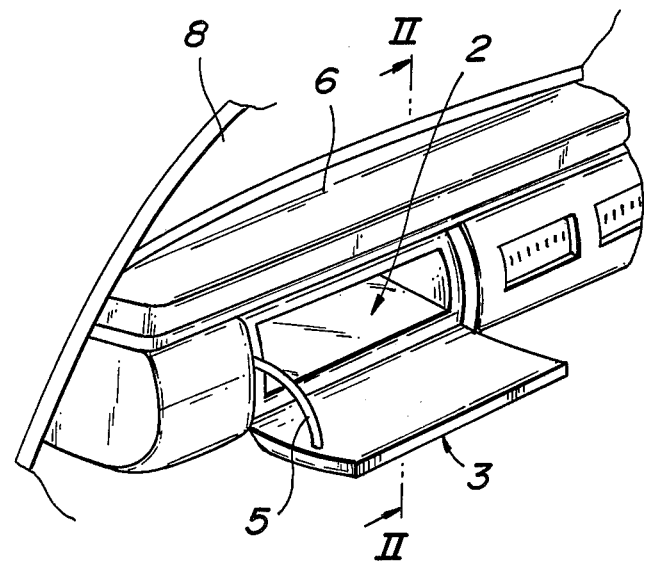
FIG. 1 is a perspective view of a glove compartment of the prior art as mentioned above.
Figure 2:
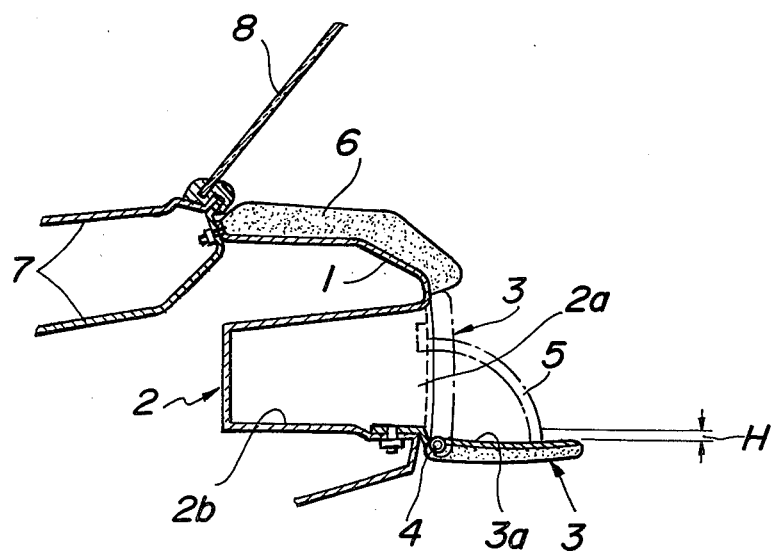
FIG. 2 is a sectional view of the glove compartment taken along the line II—II in FIG. 1 as mentioned above.

Referring to FIGS. 3–5 which illustrate two embodiments of the invention, an instrument panel 9 is sunk to form a glove compartment 10 consisting of a bottom plate 10a, a left side plate 10b, a right side plate 10c, a front panel 10d, lid supports 10e for supporting a first lid 11 and a second lid 13 later described. The first lid 11 is adapted to be pivotally pulled about a hinge 12 at the rear edge of the bottom plate 10a in a direction of an arrow A into an open position S and comprises an inner panel 11a and a pad 11b. The inner panel 11a of the lid 11 extends downwardly in its closed or vertical position to form an extension 11c, so that when the lid 11 is opened, the extension 11c abuts against the bottom plate 10a of the compartment 10 to securely maintain the upper surface of the inner panel 11a of the first lid 11 flush with the bottom plate 10a. The second lid 13 is adapted to be pivotally pushed upwardly about a hinge 14 at the upper edge of the front plate 10d in a direction of an arrow B into its open position R and comprises an inner panel 13a and a pad 13b serving as an upper cover of the compartment 10. The hinge 14 is provided with a spring (not shown) to keep the second lid 13 in the open position R.

An illuminator 15 may be provided as shown in FIG. 5, which comprises a casing 15a, a lamp 15b and a filter 15c for illuminating the upper surface of the bottom plate 10a of the compartment 10 and the inner panel 11a of the first lid 11 in the open position. In this embodiment, the illuminator 15 forms a part of the front panel 10d. A commercially available finisher (not shown) may be attached to the bottom plate 10a and the inner panel 11a of the first lid 11. A cowl top panel 16 and a windshield 8 are shown in the drawings.

The operation of the glove compartment will be explained hereinafter.

For the purpose of storage of goods, the first and second lids 11 and 13 are pivotally moved in the directions of the arrows A and B into the open positions S and R, respectively, thereby enabling tall goods and others complicated in shape to be taken into and out of the compartment with ease.

The first and second lids 11 and 13 are opened in the manner as above described to obtain a wide space and a wide desk surface (consisting of the first lid 11 and the bottom plate 10a) for writing and putting thereon a relatively large article. Moreover, a heavy article can also be taken out of the compartment only by pulling it, so that there is no risk of hurt a user's waist.

At night, the lamp 15b of the illuminator 15 arranged in the glove compartment 10 is lighted to illuminate the bottom plate 10b and the inner panel 11a of the first lid 11.

The position of the illuminator 15 is not limited to the location in the front panel 10d as in the above embodiment. The illuminator may be provided on the second lid 13. In this case, the area to be illuminated can be varied by changing the angle of opening of the second lid 13. At the maximum open degree of the lid 13, the illuminator serves as an interior lamp. The illuminator may be provided on the side plate 10b or 10c.

As can be seen from the above description, the glove compartment according to the invention comprises the first lid for the rear surface of the compartment and the second lid for the upper surface of the compartment and upon opening the first lid the inner panel thereof forms a coplanar surface with the bottom plate of the glove compartment, whereby the surface can be used not only for accommodating goods but also for a place for writing and putting hand baggages.

The first lid and bottom plate forms not only a wide surface but also a single surface without any stepped or curved portion therein and any obstructive member such as a stopper in the prior art, so that it is very convenient for writing. Moreover, the glove compartment according to the invention is so constructed as to be provided with an illuminator, if required, which makes the compartment possible to be used for writing regardless of day and night or light and darkness.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A glove compartment in an instrument pannel of an automotive vehicle, comprising: a bottom plate having a front portion and a rear portion when looking forwardly, and lid means including a first lid pivotally connected to said compartment adjacent said rear portion, and a second lid pivotally connected to said compartment adjacent to but spaced upwardly above said front portion, said first lid having an essentially planar inner surface, said first and second lids each being pivotable into closed positions in which they close said compartment, and into open positions in which said first lid forms a flush, abutting extension of said bottom plate and said second lid provides access to said compartment from above.

2. A glove compartment according to claim 1, wherein said instrument pannel is sunk to form a space for said glove compartment.

3. A glove compartment according to claim 1, wherein an illuminator is provided in said glove compartment.

4. A glove compartment according to claim 3, wherein said illuminator is located on a front pannel of said glove compartment.

* * * * *